United States Patent [19]
Glisic et al.

[11] Patent Number: 5,754,541
[45] Date of Patent: May 19, 1998

[54] DATA TRANSMISSION METHOD, BASE STATION, AND SUBSCRIBER TERMINAL

[75] Inventors: Savo Glisic; Ilkka Keskitalo; Pentti Leppänen; Tero Ojanperä ; Juha Rapeli; Kari Rikkinen, all of Oulu, Finland

[73] Assignees: Nokia Telecommunications Oy, Espoo; Nokia Mobile Phones Ltd., Salo, both of Finland

[21] Appl. No.: 602,741

[22] PCT Filed: Jun. 19, 1995

[86] PCT No.: PCT/FI95/00350

§ 371 Date: Apr. 19, 1996

§ 102(e) Date: Apr. 19, 1996

[87] PCT Pub. No.: WO95/35637

PCT Pub. Date: Dec. 28, 1995

[30] Foreign Application Priority Data

Jun. 20, 1994 [FI] Finland ................. 942961

[51] Int. Cl.[6] ............................................. H04B 7/216
[52] U.S. Cl. .................................................... 370/335
[58] Field of Search ........................... 370/319, 320, 370/321, 322, 329, 335, 336, 337, 468, 465, 437, 441, 442, 252; 455/422; 379/59, 60; 375/200, 205

[56] References Cited

U.S. PATENT DOCUMENTS

| | | | |
|---|---|---|---|
| 4,574,378 | 3/1986 | Kobayashi | 370/503 |
| 4,630,261 | 12/1986 | Irvin . | |
| 4,630,262 | 12/1986 | Callens et al. . | |
| 4,901,307 | 2/1990 | Gilhousen et al. . | |
| 4,980,886 | 12/1990 | Berstein . | |
| 5,101,501 | 3/1992 | Gilhousen et al. | 455/33 |
| 5,109,390 | 4/1992 | Gilhousen et al. | 375/1 |
| 5,319,638 | 6/1994 | Lin | 370/417 |
| 5,347,521 | 9/1994 | Zijerhand | 370/321 |
| 5,491,801 | 2/1996 | Jain et al. | 395/200.13 |

FOREIGN PATENT DOCUMENTS

| | | |
|---|---|---|
| 0 472 349 | 2/1992 | European Pat. Off. . |
| 0 583 233 | 2/1994 | European Pat. Off. . |
| 925472 | of 1992 | Finland . |
| 92/00693 | 1/1992 | WIPO . |
| 94/29980 | 12/1994 | WIPO . |
| 95/07578 | 3/1995 | WIPO . |

OTHER PUBLICATIONS

Kleinrock et al., "Packet Switching in Radio Channels: Part I–Carrier Sense Multiple-Access Modes and Their Throughtput-Delay Characteristics", *IEE Transactions on Communications*, vol. Com–23, No. 12, Dec. 1975, pp. 1400–1416.

Primary Examiner—Douglas W. Olms
Assistant Examiner—Ajit Patel
Attorney, Agent, or Firm—Cushman Darby & Cushman IP Group of Pillsbury Madison & Sutro LLP

[57] ABSTRACT

A base station, subscriber terminal, and data transmission method in a CDMA cellular radio network having in each cell at least one base station which communicates on a specified traffic channel with the terminal equipments (Mobile Station) located within its area, the signal of the users being divided in the method into bursts in the time domain. To achieve high traffic capacity together with high-quality connections, the base station monitors the load state of the traffic channel in the data transmission method of the invention and transmits information about the load state of the traffic channel to the terminal equipments. In the method, the number of the bursts transmitted between the terminal equipments and the base stations per time unit is controlled on the basis of the delay state of the bursts and the load state information computed at the base station.

19 Claims, 4 Drawing Sheets

|   |   | 1 | 2 | 3 | 4 | USER 1 |
|---|---|---|---|---|---|--------|
|   |   |   |   | 1 | 2 | USER 2 |
| 1 | 2 | 3 | 4 | 5 | 6 | USER 3 |
|   |   |   |   | 1 | 2 | USER 4 |
|   |   |   |   |   | 1 | USER 5 |
|   |   |   |   |   | 1 | USER 6 |
|   |   |   |   | 1 | 2 | USER 7 |
|   |   |   |   |   | 1 | USER 8 |
|   |   |   |   |   | 1 | USER 9 |

FIG. 4a

|   |   |   |   | 3 | 4 | USER 1 |
|---|---|---|---|---|---|--------|
|   |   |   |   | 1 | 2 | USER 2 |
|   |   |   |   | 5 | 6 | USER 3 |
|   |   |   |   | 1 | 2 | USER 4 |
|   |   |   |   |   | 1 | USER 5 |
|   |   |   |   |   | 1 | USER 6 |
|   |   |   |   | 1 | 2 | USER 7 |
|   |   |   |   |   | 1 | USER 8 |
|   |   |   |   |   | 1 | USER 9 |

FIG. 4b

DATA TRANSMISSION METHOD, BASE STATION, AND SUBSCRIBER TERMINAL

BACKGROUND OF THE INVENTION

The invention relates to a data transmission method in a CDMA cellular radio network having in each cell at least one base station which communicates on a specified traffic channel with the terminal equipments located within its area, the signal of the users being divided into bursts in the time domain.

CDMA (Code Division Multiple Access) is a multiple access method based on a spread spectrum technique, and it has been recently put into use in cellular radio systems in addition to previously used FDMA (Frequency Division Multiple Access) and TDMA (Time Division Multiple Access). CDMA has many advantages over the prior methods, such as spectrum efficiency, simplicity of frequency planning, and traffic capacity.

In a CDMA method, a narrowband data signal of a user is multiplied to a relatively wide band of a traffic channel by a spreading code having a much wider band than the data signal. Traffic channel band widths used in known cellular network test systems include, e.g., 1.25 MHz, 10 MHz and 25 MHz. The multiplication spreads the data signal over the entire band to be used. All the users transmit simultaneously in the same frequency band, i.e. traffic channel. A different spreading code is used on each connection between a base station and a subscriber terminal, and the signals of the users can be distinguished from one another in the receivers on the basis of the spreading code of the connection.

Correlators in conventional CDMA receivers synchronize with a desired signal, which they recognize on the basis of the spreading code contained in the signal. In the receiver, the data signal is restored to the original band by multiplying it by the same spreading code as in the transmission step. Ideally, the signals that have been multiplied by some other spreading code in the transmission step do not correlate with the spreading code used in the receiver and are thus not restored to the narrow band. In view of the desired signal, they thus appear as noise. If possible, the spreading codes of the system are selected in such a way that the codes in each cell of the system do not correlate with one another, i.e. they are mutually orthogonal.

U.S. Pat. No. 4,901,307 describes a CDMA system in which a higher traffic capacity is achieved with the multiple access method concerned than with the earlier methods.

In both FDMA and TDMA multiple access methods, each user is assigned a specified traffic channel on which the other users cannot communicate. In FDMA, the channel is a specified narrow frequency band, and in TDMA, the channel is a specified time slot on a given frequency band. In principle, the traffic capacity of these systems can thus be simply defined as a sum of separate channels, either frequencies or time slots, available. If all the frequencies or time slots are busy, new users cannot be served until one of the existing users breaks the connection.

In a CDMA system, all the users transmit on the same, relatively wide frequency band. The traffic channel of each user is provided by a spreading code characteristic of the respective connection of each user on the basis of this code, the transmission of user is distinguished from the transmissions on the other connections, as described above. As there are usually a large number of spreading codes in use, the CDMA system does not have such an absolute limit for the capacity as the FDMA and TDMA systems have. CDMA is an 'interference-restricted' system, in which the number of users is restricted by the amount of interference that they are allowed to cause to one another. Since in practice, the spreading codes of the users are not completely orthogonal, especially not as compared with the spreading codes used in a neighbouring cell, simultaneous users interfere with one another to some extent. This mutual interference is called multiple access interference. When the number of users increases, the interference they cause to one another increases also, and with a certain number of users the interference is so great as to weaken the quality of the connections. In a CDMA system, it is possible to define a level of interference that must not be exceeded, and thereby to limit the number of simultaneous users, i.e. the capacity of the system. The number, however, can be exceeded temporarily, i.e. some of the quality of the connection can be sacrificed to the capacity.

In a typical cellular network, the signals between a base station and a subscriber terminal propagate over various paths between the transmitter and the receiver. This multipath propagation is primarily due to the signal being reflected from the surrounding surfaces. The signals propagated over different paths arrive at the receiver at different times due to their different propagation delays. CDMA differs from conventional FDMA and TDMA in that multipath propagation can be utilized in receiving the signal. The receiver generally used in CDMA is a RAKE receiver, which comprises one or more RAKE branches. Each branch is an independent receiver unit assembling and demodulating one received signal component. Each RAKE branch can be adjusted to synchronize with a signal component propagated over a different path, and in a conventional CDMA receiver, the signals of the receiver branches are combined in an advantageous manner, e.g. coherently, to obtain a signal of good quality. Multipath propagation can be utilized in the receivers of both the base station and the terminal equipment. Where a terminal equipment is concerned, the signal components received by the receiver branches can be transmitted from one or—in macrodiversity—more base stations. The above referenced type of CDMA systems utilizing multipath propagation are disclosed in U.S. Pat. Nos. 5,101, 501 and 5,109,390.

International patent application WO 92/00693, which is incorporated herein by reference, discloses a CDMA system in which voice activity detection is used for increasing traffic capacity. It is well known that a speaker pauses not only between sentences and words, but within words also. A pause between words may last seconds, whereas a pause within a word lasts dozens of milliseconds only. The measuring results show that when a person speaks, he or she is actually making sounds for only ⅝ of the time, whereby the voice activity coefficient is ⅝. The voice activity coefficient is naturally dependent on the measuring accuracy, i.e. how short a pause can be distinguished.

The above referenced WO patent application teaches a system in which the signal transmitted by the user is divided into bursts in the time domain, the bursts being assembled in view of voice activity. No signal (i.e. bursts) to be transmitted is thus generated during pauses. A transmission from a user are thus not continuous signalling but comprises pauses, since when the speaker makes a pause, no bursts are transmitted. In a multiple user system, the number of users transmitting simultaneously thus varies continuously with the voice activity. If, for example, there are N calls in progress simultaneously and the voice activity is ⅝, it can be assumed that ⅝*N transmitters are in the transmission mode simultaneously.

In a prior art system, the number of simultaneous signals transmitted by the users varies with the voice activity. There are moments when the number of simultaneous transmissions is smaller than the capacity of the system, i.e. the channel is not used efficiently. Also, there are moments when the number of simultaneous transmissions is larger than the channel capacity. In the latter situation, the quality of the connections of the users, which can be measured e.g., by a bit error ratio, is worse than defined in the system.

SUMMARY OF THE INVENTION

The object of the present invention is to provide a system in which the number of simultaneous transmissions can be controlled accurately and maintained as close as possible to the optimum channel capacity to achieve high traffic capacity together with high quality connections.

This is achieved with a data transmission method of the type disclosed in the introductory part of the BACKGROUND section of this Specification, in which the base station monitors the load state of the traffic channel, the base station sends the terminal equipments information about the load state of the traffic channel, and the number of the bursts to be transmitted between the terminal equipments and the base stations per time unit is controlled on the basis of the delay state of the bursts and the load state information computed at the base station.

The invention also relates to a data transmission method implemented in a CDMA cellular radio network having in each cell at least one base station which communicates on a specified traffic channel with the terminal equipments located within its area, the signal of the users being divided into bursts in the time domain. The data transmission method of the invention is characterized in that the base station monitors the load state of the traffic channel, each burst sent to an individual terminal equipment with which the base station communicates is stored in its own buffer memory at the base station before the transmission, and the number of the bursts transmitted by the base station to the terminal equipments per time unit depends on the number of the bursts stored in the buffer memories.

The invention also relates to a base station for use in a CDMA cellular radio network having in each cell at least one base station which communicates on a certain traffic channel with the terminal equipments located within its area, the base station comprising means for dividing the signal to be transmitted to the terminal equipments into bursts in the time domain. The base station of the invention is characterized in that the base station comprises means for monitoring the load of the traffic channel, means for transmitting information about the load state to the terminal equipments, means for storing the bursts in the buffer memory, and means for controlling the transmission of the bursts to the terminal equipments on the basis of the traffic channel capacity and the number of the bursts stored in the buffer memory.

The invention further relates to a subscriber terminal for use in a CDMA cellular radio network having in each cell at least one base station which communicates on a certain traffic channel with the terminal equipments located within its area, the terminal equipment comprising means for dividing the signal transmitted to the base station into bursts in the time domain. The terminal equipment of the invention is characterized by comprising means for controlling the number of the bursts to be transmitted to the base station per time unit on the basis of the instantaneous traffic load of the traffic channel and the delay state of the bursts.

In the method of the invention, the base station thus monitors the load state of the traffic channel. The information about the load state is transmitted to the subscriber terminals, which utilize it in controlling the number of the signal bursts transmitted. By the method, the load of the channel can be maintained optimally close to the desired channel capacity, i.e. the traffic channel capacity can be utilized as well as possible without compromising on the quality of the connection.

In a preferred embodiment of the invention, the base station sends the terminal equipments information indicating whether the current channel load is lower than, equal to or higher than the channel capacity. The terminal equipments store the signal bursts to be transmitted in a buffer memory. The terminal equipments control the number of the bursts to be transmitted per time unit on the basis of the current number of bursts in the buffer memory, the delay state of these bursts, and the load state information transmitted from the base station. According to one preferred embodiment of the invention, the terminal equipments use a CSMA (Carrier Sense Multiple Access) protocol in the transmission of the bursts.

BRIEF DESCRIPTION OF THE DRAWINGS

In the following, the invention will be described in greater detail with reference to the examples illustrated in the attaching drawings, wherein:

FIGS. 4a and 4b illustrate a possible state of the buffer memory of a base station both before and after the transmission.

DETAILED DESCRIPTION

Figure 1:
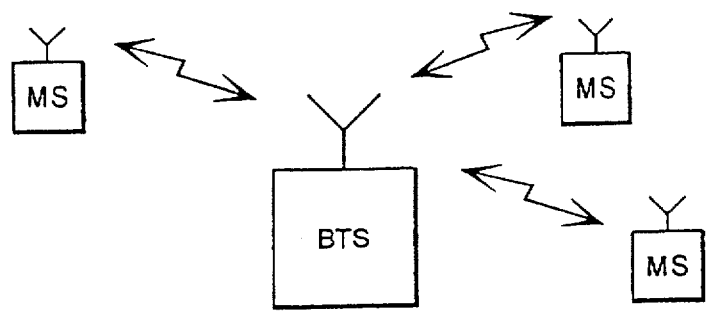
FIG. 1 shows a cellular radio network in which the method of the invention can be applied.

FIG. 1 shows a CDMA cellular network system in which the data transmission method of the invention can be applied. The cellular radio network comprises in each cell at least one base station (BTS) which communicates on a specified traffic channel with the terminal equipments (MS) located within its area. The traffic channel thus comprises a wide frequency band employed by all the terminal equipments in their transmissions to the base station; in the opposite direction of transmission, i.e. from the base station to the terminal equipments, there is a similar frequency band, in which the base station transmits data to the terminal equipments located within its area.

In the method of the invention, the load state of the traffic channel is monitored continuously, and on the basis of this information, the transmission in the subscriber terminals is controlled so that the load of the traffic channel is as close to the channel capacity as possible. Another parameter affecting the transmission is the delays of the bursts to be transmitted. The transmission of the bursts to the terminal equipments is controlled at the base station on the basis of the channel capacity and the burst generation.

Figure 2:
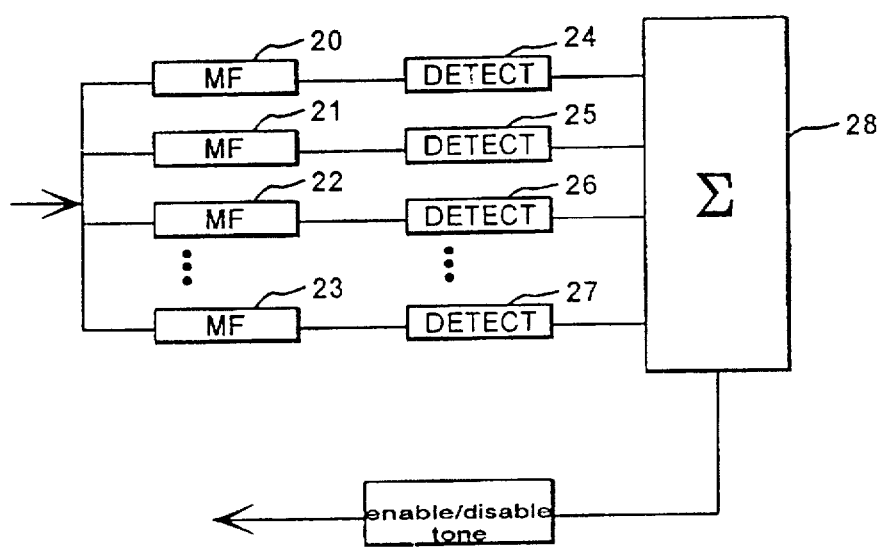
FIG. 2 is a scheme illustrating the operation of the method of the invention in a base station.
Figure 3:
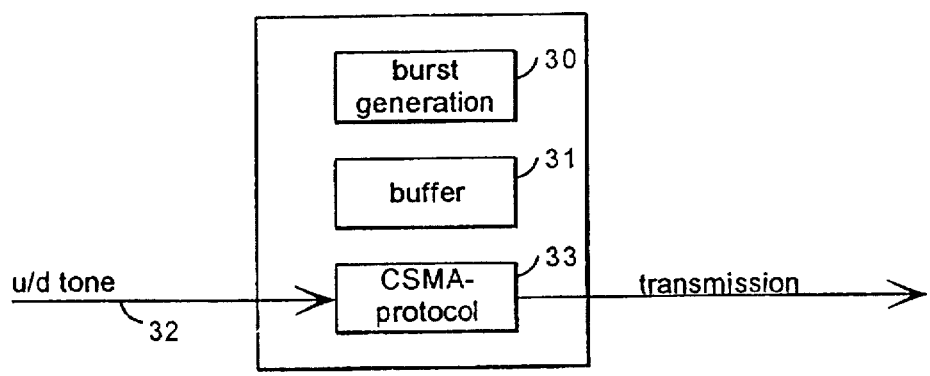
FIG. 3 is a scheme illustrating the operation of the method of the invention in a subscriber terminal.

The load state of the traffic channel is monitored at the base station. FIG. 2 is a scheme illustrating the operation of the method at the base station. The base station typically comprises N matched filters 20–23, each of which is synchronized to receive and demodulate N simultaneous signals from subscriber terminals. Let only n of the N terminal equipments be simultaneously active, i.e. transmit a signal to the base station. At the base station, the matched filters are followed by detectors 24–27, which detect at the output of the matched filters whether or not the output of the filter contains a received signal. The output of the detectors has the value '1' or '0' depending on whether or not the received signal appears at the output of the filter. Addition of the values in an adder 28 produces information about the number n of active transmissions.

In practice, the detection can be implemented, e.g. by squaring the output signal of the matched filter and comparing the value with a threshold value obtained by using a CFAR (Constant False Alarm Rate) algorithm. The number of peaks detected at the outputs of the matched filters during a bit interval corresponds to the number n of packets transmitted on a traffic channel. It is also possible to add together the squared outputs of the matched filters, and to make soft statistical decisions therefrom and compare the so-obtained result with the pre-set or computed threshold value.

To ensure correct load state information, it is possible to use a special method known as two-dimensional packet detection. In spread spectrum transmissions, the time interval $T_c$ between the correlation peaks in a direct sequence signal is known to be a constant. When the first correlation peak has been detected at the output of the matched filter, the second correlation peak arriving after a time interval $T_c$ can thus be used to ensure that the first observation has been correct.

According to one preferred embodiment of the invention, the load information about the traffic channel can be transmitted to the terminal equipments as MFSK-modulated signalling information, in the form of an enable/disable/reset signal. The load state of the traffic channel is compared with the channel capacity C, and if the current load n of the channel is higher than C, a reset signal is supplied to the terminal equipments. Similarly, if the current load n of the channel is lower than C, an enable signal is supplied to the terminal equipments. If the load equals the capacity, a disable signal is supplied to the terminal equipments. This load information is transmitted continuously so that each subscriber terminal has access to the information at every moment.

The terminal equipment can also be informed of the load state by a two-level or higher than three-level signal, depending on how accurate control is wanted and what kind of control method is used in the terminal equipments.

The load information about the traffic channel need not be sent as an MFSK-modulated signal to the terminal equipments; it can also be transmitted, e.g., as a wideband pilot signal by adding extra information to the data signal and using a signalling channel common to all the users for the transmission.

The terminal equipments receive the load information signal transmitted by the base station simultaneously with normal data traffic. In the terminal equipments, CDMA employs adaptive interference cancellation methods, by which the narrowband MFSK signal transmitted is eliminated from the received wideband signal. The transmission of the load information thus does not weaken the quality of the actual connection. The effect of a load information signal transmitted as a wideband signal can also be eliminated by the interference cancellation methods.

According to another preferred embodiment of the invention, the base station estimates a change in the load state of the traffic channel upward or downward, and controls the transmission of the terminal equipments accordingly. This makes it possible to respond to a change on the traffic channel rapidly.

FIG. 2 is a schematic diagram illustrating the operation of the method according to the invention in a subscriber terminal. In the terminal equipment, the signal to be transmitted is divided into bursts 30 in the time domain and stored in a buffer memory 31 for transmission. The terminal equipment receives information from the base station about the load of the traffic channel in the form of e.g., an enable/disable/reset signal 32. Full utilization of the available traffic capacity requires careful optimization. The information contained in the above-mentioned enable/disable/reset signal and the information about the state of the buffer memory are utilized in the subscriber terminals in transmitting signal bursts to the traffic channel.

In a preferred embodiment of the method according to the invention, a CSMA-based (Carrier Sense Multiple Access) protocol is used in the subscriber terminal for controlling the transmission. In the following, one protocol alternative is described by way of an example.

When there is a burst in the buffer of a terminal equipment ready for transmission, the terminal checks the signal received from the base station for the load state of the traffic channel. If the load of the channel is higher than or equal to the capacity, i.e. the base station has been transmitting a disable or reset signal, a new attempt is made to send the burst after a delay computed by a random number generator. If the load of the channel is lower than the capacity, i.e. the base station has been transmitting an enable signal, the burst is transmitted immediately. If the delay of the burst in the subscriber terminal exceeds a predetermined value, the burst can be transmitted, if necessary, regardless of a disable signal transmitted by the base station.

Various CSMA protocols are known from the literature. Many of these can be applied in the method of the invention, but the characteristics of the invention must be borne in mind: e.g. that in the event of a collision, the burst need not be re-transmitted, since bursts whose transmissions coincide are not destroyed but only worsen the bit error ratio of all the users. CSMA protocols are discussed in greater detail in Kleinrock, Tobagi: 'Packet Switching in Radio Channels: Part I—Carrier Sense Multiple Access Modes and Their Throughput Delay Characteristics', *IEEE Transactions on Communications*, Vol. COM-23, No. 12, pp. 1400–1416, December 1975.

Voice information and other data information have different characteristics and different requirements for the channel to be used for the transmission of the information. The requirements for delays in voice transmission are very strict. Data, on the one hand, tolerates much longer delays than voice, but is, on the other hand, bursty in nature. Different data transmissions may also have different characteristics, such as delay tolerance, priority differences and burstiness. The method of the invention can be applied such that different protocols are used for such different types of information. The capacity of the cellular network can thus be used optimally, although transmissions of different types are sent in the network. Different protocols can be used, for example, with transmissions having a different priority, different burst forms and maximum delays allowed.

In the following example, the base station is assumed to send information to the terminal equipments about the load state of the channel using an enable/disable/reset signal as described above, and the terminal equipments are assumed to send either voice or bursty, delay-tolerant data information.

If the terminal equipment transmits voice, the burst interval $T_p$ is divided into M time slots of one $T_s$ in length, $T_s$ being greater than the propagation delay from the terminal equipment to the base station and back (MS-BTS-MS). If the signal transmitted by the base station is an enable signal, the burst is transmitted with a pre-set probability of pv. With the probability of 1-pv, a new attempt in made after an interval of one $T_s$. If a disable signal is detected at the moment the new decision is made, the transmission is delayed by an entire bit interval before a new attempt. If the burst is delayed in the terminal equipment longer than indicated by a predetermined value, the burst can be transmitted immediately, if necessary. Transmission of information having a low delay-tolerance can thus be accommodated.

If the terminal equipment sends data, the protocol is otherwise of the type described above, but the used transmission probability pd is lower than the pv used with voice. If a reset signal from the base station is detected during the transmission, the transmission is interrupted.

The example provided above is an example of only one possible protocol. The protocol employed by the terminal equipment may also take into account the delay caused by the buffer memory and estimate the delay of the future bursts as it makes the decision to transmit. If the delay is not critical and the channel is busy, the terminal equipment does not proceed with the transmission. If the delay is critical, the burst is either rejected or transmitted despite the load of the channel.

The description provided above is a description of protocols used by the terminal equipment in controlling a transmission. In the method of the invention, the base station controls its transmission in the same way as the terminal equipment, based on the state of the buffer memory.

The base station divides the transmission of each connection into bursts in the time domain, and stores bursts in the individual buffer memories of the connections. The method is illustrated in FIG. 4a, which shows the states of the buffer memories of the base station in a nine-user example. Different connections have a different number of bursts in the buffer memory waiting to be transmitted. In a preferred embodiment of the method according to the invention, the protocol used by the base station maintains, if possible, the number of bursts in various buffer memories equal. In the example of FIG. 4a, user 1 has four bursts in the buffer, user 2 has two bursts, user 3 has six bursts, etc. New bursts are added to the right-hand side of the buffer and transmitted from the left-hand side. Let the capacity C of the traffic channel be six, i.e. the base station sends six bursts at a time. As the base station attempts to maintain the number of bursts in different buffers equal, it sends in (in the example illustrated in FIG. 4a) six bursts from the left during the next time slot so that, after the transmission, the state of the buffer memories is as shown in FIG. 4b.

Figure 5:
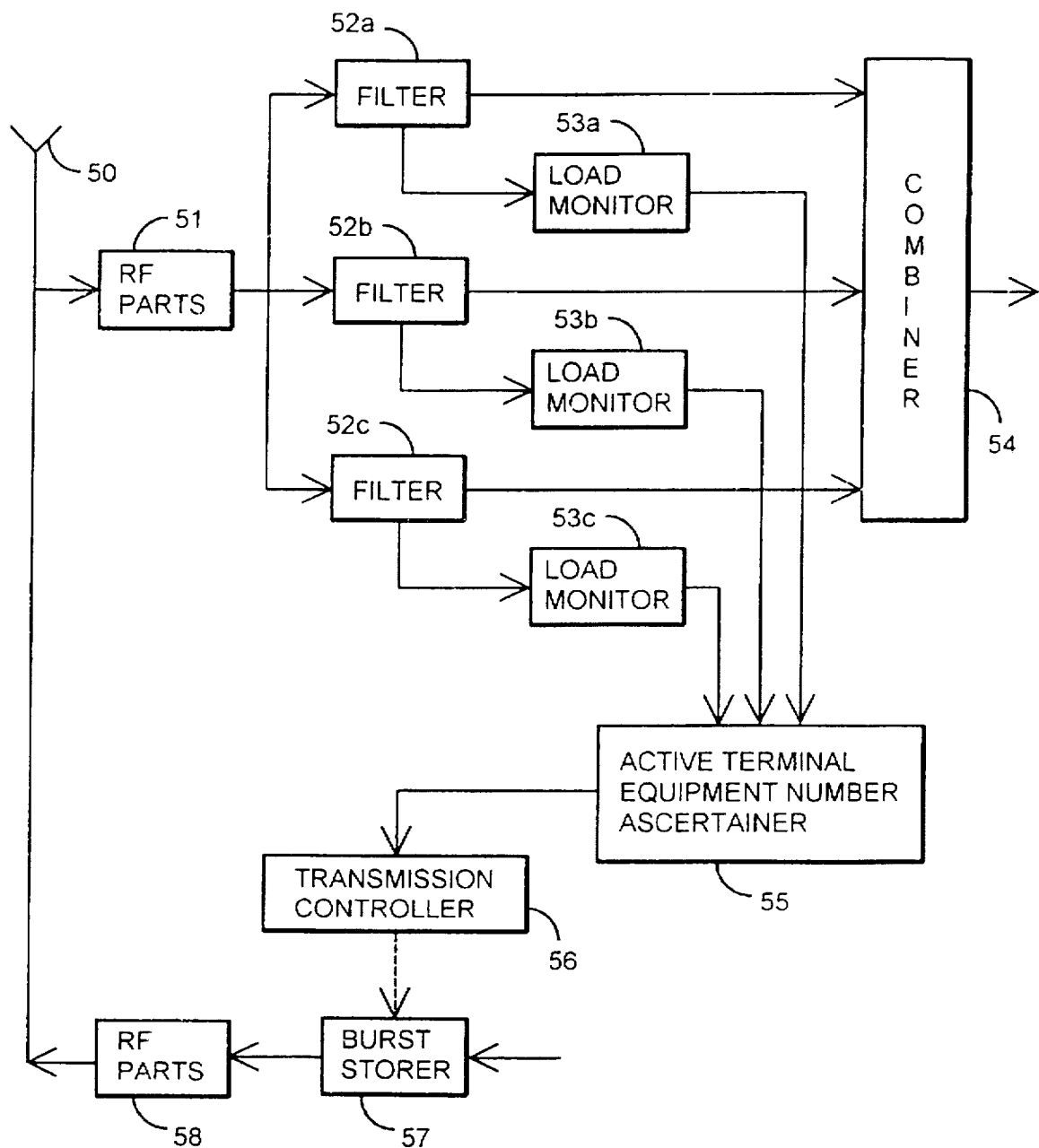
FIG. 5 is a block diagram illustrating the structure of a base station according to the invention.

FIG. 5 is a block diagram illustrating the structure of a base station of the invention in a CDMA cellular radio network. On the receiver side, the base station comprises an antenna 50 by which a received signal is supplied through radio frequency parts 51 to a number of matched filters or correlators 52a–52c, each of which is synchronized to receive and demodulate simultaneous signals from subscriber terminals. From the matched filters, the signal is supplied to a combiner 54, which combines the different signal components of one and the same user in an advantageous manner. The base station of the invention also comprises means 53a–53c and 55 connected to the output of the matched filters for monitoring the load of the traffic channel. Means 53a–53c can be implemented, e.g. in such a way that they detect whether or not each of the matched filters is receiving a signal at a given moment. The results obtained can be added in means 55 to obtain the number of active terminal equipments. It must naturally be taken into account here that several matched filters may be synchronized with a component of one and the same transmission of the terminal equipment propagated over a different path. In practice, means 53a–53c, 54 and 55 of the base station can be implemented in many ways, also by incorporating them into one and the same component.

On the transmitter side, the base station comprises means 57 for modulating the signal to be transmitted and for dividing it into bursts in the time domain, and means 57 for storing the bursts of each connection in a buffer memory specific for the connection. The base station also comprises means 56 for controlling the transmission of the bursts through radio frequency parts 58 to the terminal equipments on the basis of the number of the bursts stored in the buffer memory, and means 56, 57 for sending the subscriber terminals information about the load state of the traffic channel.

The base station also comprises other components, such as A/D and D/A converters and filters, but for the sake of clarity, they do not appear in the description and the drawings since they are irrelevant to the basic idea of the invention.

Figure 6:
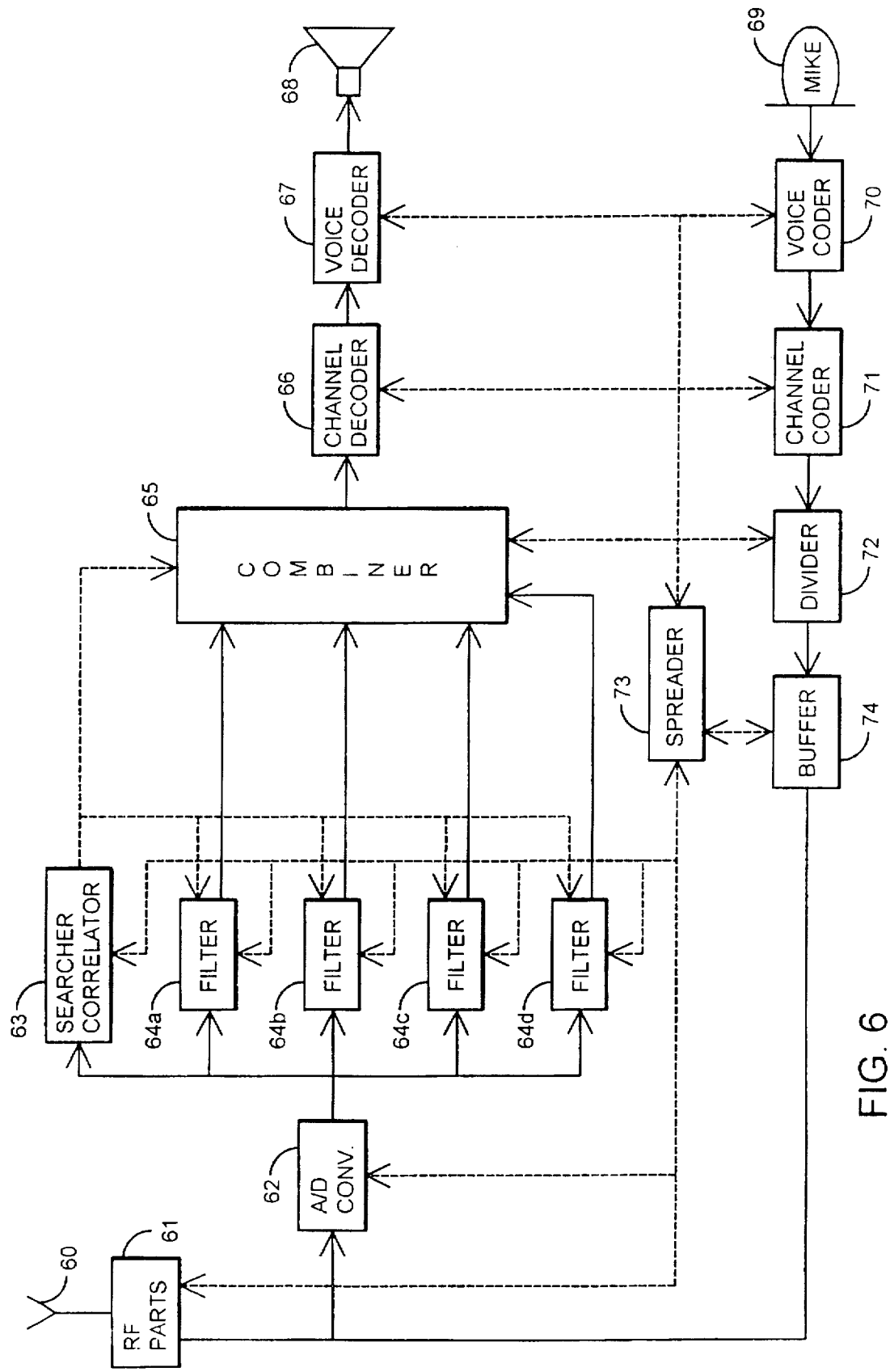
FIG. 6 is a block diagram illustrating the structure of a subscriber terminal according to the invention.

FIG. 6 is a block diagram illustrating the structure of a subscriber terminal of the invention in a CDMA cellular radio network. On the receiver side, the base station comprises an antenna 60 by which the received signal is supplied through radio frequency parts 61 to an A/D converter 62. The converted signal is supplied to matched filters 64a–64d, each of which is synchronized to a different signal component propagated over a different path. The converted signal is also supplied to a searcher correlator 63, which is used for acquiring signal components provided with a desired spreading code. From the matched filters, the signal is supplied to means 65, which combine the received signal components in an advantageous manner and detect the signal. From the combiner, the signal is supplied to a channel decoder 66, and from there through a voice decoder 67 to a loudspeaker 68. The terminal equipment of the invention also comprises means 64a–64d for receiving the information transmitted by the base station about the load state of the traffic channel. The terminal equipment of one preferred embodiment of the invention also comprises means 65 for eliminating the effect of the traffic load information from the received signal.

On the transmitter side, the subscriber terminal comprises a microphone 69 from which a signal is supplied through a voice coder 70 and channel coder 71 for spread-coding 73. The terminal equipment further comprises means 74 in which the signal to be transmitted is divided into bursts in the time domain, and means 74 in which bursts are kept in store in a buffer memory for transmission. The terminal equipment further comprises means 73 controlling the operation of the above mentioned components and regulating the number of the bursts to be transmitted per time unit on the basis of the load state of the traffic channel obtained from the base station. The terminal equipment of the preferred embodiment of the invention comprises means 73 that take into account the number of the bursts in the buffer memory as they control the transmission of the bursts.

The subscriber terminal also comprises other components, such as filters, but for the sake of clarity, they do not appear in the description and the drawings since they are irrelevant to the basic idea of the invention.

Although the invention is described above with reference to the examples illustrated in the attached drawings, it is to be understood that the invention is not limited thereto but can be modified in many ways within the scope of the inventive idea disclosed in the attached claims.

We claim:

1. A data transmission method in a CDMA cellular radio network having in each cell at least one base station which communicates on a specified traffic channel with terminal equipment of users, located within an area served by the respective base station signals of the terminal equipment being divided into bursts in the time domain, said method comprising:

monitoring by each base station of the load state of said traffic channel and the delay state of the bursts to be transmitted;

each base station sending the terminal equipment in the respective area information about the load state of said traffic channel; and controlling by each base station of the number of bursts to be transmitted between the terminal equipment in the respective area and the respective said base station per time unit on the basis of the delay state of the bursts and the load state information computed at the respective said base station.

2. The method of claim 1, wherein:

in performing said monitoring, each base station monitors the load state of the traffic channel by counting the number of currently transmitting ones of said terminal equipment in the respective said area.

3. The method of claim 2, further comprising:

sending by each base station to the respective said terminal equipment information indicating whether the number of the currently transmitting terminal equipment in the respective said area is smaller than, equal to, or larger than an optimal traffic channel capacity.

4. The method of claim 1, wherein:

each said base station, in performing said sending, sends the respective said terminal equipment information about the load state of the traffic channel using an MFSK-modulated signal.

5. The method of claim 1, wherein:

each said base station, in performing said sending, sends the respective said terminal equipment information about the load state of the traffic channel by adding information about said load state to a data signal transmitted to the respective said terminal equipment.

6. The method of claim 1, wherein:

each said base station in performing said sending, sends the respective said terminal equipment information about the load state of the traffic channel using a wideband pilot channel.

7. The method of claim 1, further including:

each base station in connection with monitoring the load state of the traffic channel, estimating chances in the load state; and said controlling of the number of the bursts to be transmitted between the respective said terminal equipment and the respective said base station per time unit on the basis of load state information computed at the respective said base station is conducted using load state estimations computed by performing said estimating.

8. The method of claim 1, further comprising:

storing in a buffer memory of each terminal equipment the bursts to be transmitted before the transmission to the respective said base station; and transmitting a number of the bursts by each terminal equipment to the respective said base station per time unit depending on the number of the bursts stored in the buffer memory of the respective said terminal equipment.

9. The method of claim 1, further including:

causing the number of the bursts transmitted by each terminal equipment to the respective said base station per time unit to depend on at least one preselected characteristic of the information the respective said terminal equipment is transmitting.

10. The method of claim 9, wherein:

said causing includes causing the number of the bursts transmitted by the each terminal equipment to the respective said base station per time unit to depend on at least one of delay-tolerance, priority and burstiness of the information to be transmitted.

11. The method of claim 1, further including:

each terminal equipment uses using a CSMA protocol in transmitting respective said bursts to the respective said base station.

12. The method of claim 1, wherein:

said bursts vary in length at different moments of time.

13. A data transmission method in a CDMA cellular radio network having in each cell at least one base station which communicates on a specified traffic channel with terminal equipment of users, located within an area served by the respective base station, signals of the terminal equipment being divided into burst in the time domain, said method comprising:

monitoring by each base station of the load state of said traffic channel and the delay of state of the bursts to be transmitted;

storing each burst sent to each respective individual said terminal equipment of a plurality of said terminal equipment with which a respective said base station communicates on respective connections in a respective buffer memory at the respective said base station before transmitting respective said bursts; and causing the number of the bursts transmitted by each said base station to the respective said terminal equipment per time unit to depend on the number of the bursts stored in the respective said buffer memories.

14. The method of claim 13, further including each base station maintaining the number of the bursts in the buffer memories of the respective said connections to one another.

15. A base station for use in a CDMA cellular radio network having in each cell at least one base station which communicates on a specified traffic channel with the terminal equipment located within an area served by the respective base station said base station comprising:

means for dividing a signal to be transmitted to the respective said terminal equipment into bursts in the time domain;

means for monitoring the load state of said traffic channel;

means for transmitting information about the load state of said traffic channel as monitored, to the respective said terminal equipment;

means for storing the bursts in a buffer memory; and means for controlling transmission of the bursts to the respective said terminal equipment on the basis of the traffic channel capacity and the number of the bursts stored in buffer memory.

16. The base station of claim 15, wherein:

said means for monitoring the load state of the traffic channel are arranged to perform said monitoring by counting the number of the currently transmitting ones of said terminal equipment within said area.

17. A terminal equipment for use in a CDMA cellular radio network having in each cell at least one base station which communicates on a specified traffic channel with the terminal equipment located within an area served by the respective base station, said terminal equipment comprising:

means for dividing a signal to be transmitted to the respective said base station into a plurality of bursts in the time domain, said bursts being subject to delays each having a delay state; and means for controlling the number of the bursts to be transmitted to the respective said base station per time unit on the basis of the instantaneous traffic load of the traffic channel and the delay states of the bursts.

18. The terminal equipment of claim 17, further comprising:

means for storing the bursts in a buffer memory; and means for controlling the number of the bursts to be transmitted to the base station per time unit on the basis of the number of the bursts stored in said buffer memory.

19. The terminal equipment of claim 17, further comprising:

means for receiving information transmitted from the base station about a traffic load state of said channel; and means for eliminating said information as to load state from said signal.

* * * * *